P. F. MARCANTE.
RESILIENT WHEEL.
APPLICATION FILED JULY 25, 1913.
1,093,448.
Patented Apr. 14, 1914.
2 SHEETS—SHEET 2.
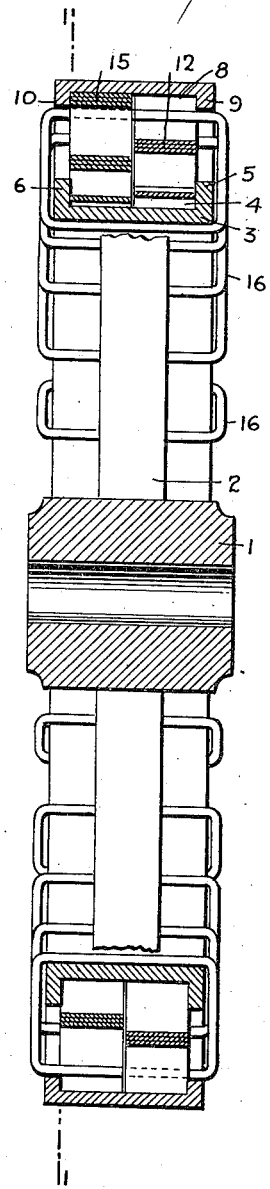
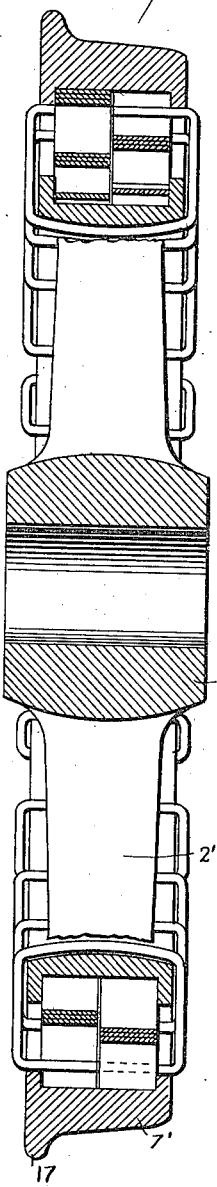
WITNESSES
H. J. Walker
A. L. Kitchin
INVENTOR
Peter F. Marcante
BY Munn & Co
ATTORNEYS

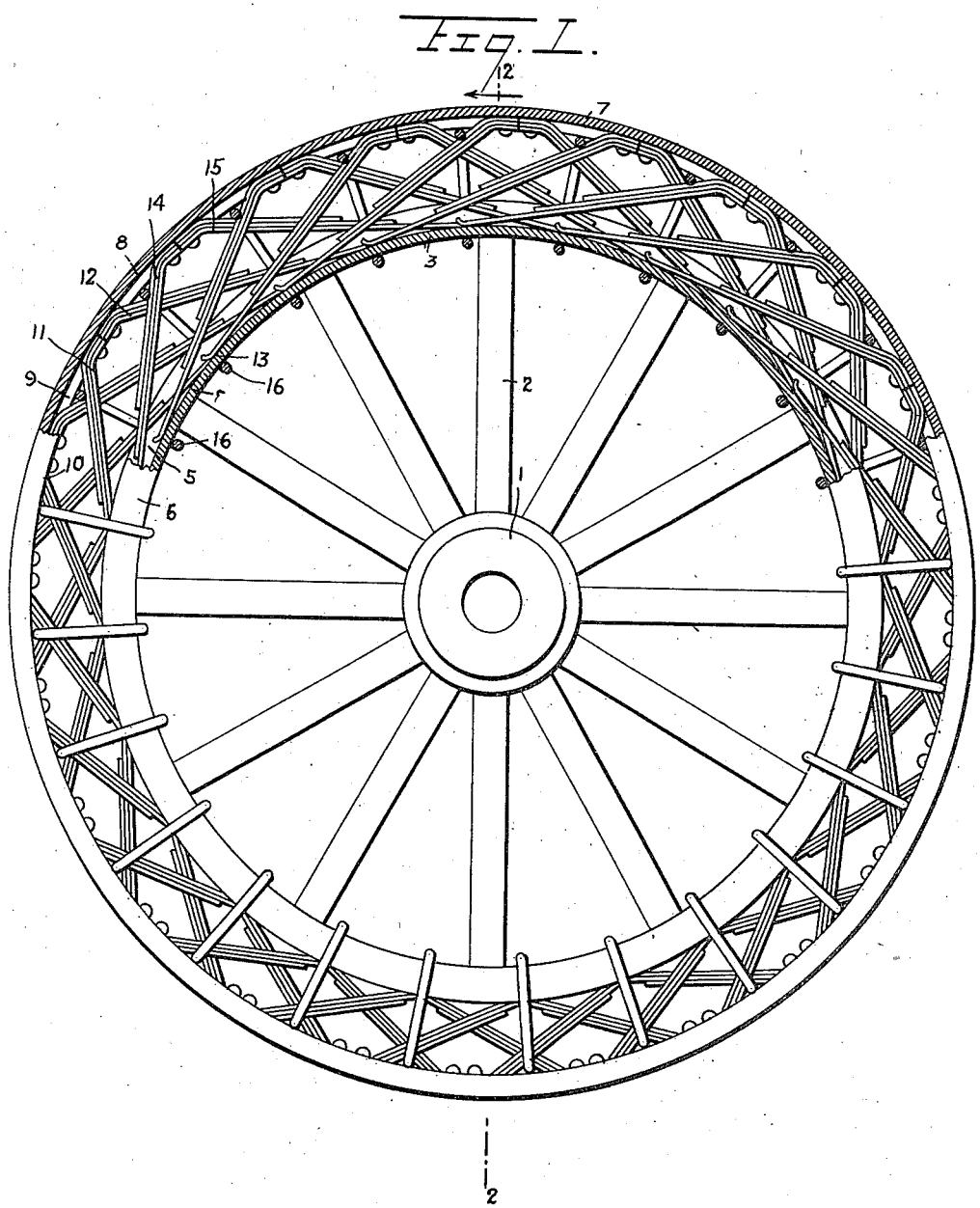

UNITED STATES PATENT OFFICE.

PETER FRANK MARCANTE, OF ALLENTOWN, PENNSYLVANIA.

RESILIENT WHEEL.

1,093,448.   Specification of Letters Patent.   Patented Apr. 14, 1914.

Application filed July 25, 1913. Serial No. 781,116.

*To all whom it may concern:*

Be it known that I, PETER F. MARCANTE, a citizen of the United States, and a resident of Allentown, county of Lehigh, and State of Pennsylvania, have invented a new and Improved Resilient Wheel, of which the following is a full, clear, and exact description.

This invention relates to improvements in resilient wheels, and has for an object to provide an improved structure in which all the springs are adapted to operate when a load is placed on the wheel.

A further object of the invention is to provide an improved spring wheel structure in which the various springs are retained under a predetermined tension, and are all caused to act in unison when there is a sudden jar or load placed on the wheel whereby lighter springs may be used as all the strain of a sudden weight or jar does not come under a single spring.

A still further object of the invention is to provide a spring wheel structure in which the outer portion is formed with a pair of rims, the interior surface of the inner rim being of any structure so as to receive a wheel portion and the outer surface of the outer rim being of any desired structure according to the work designed to be accomplished by the wheel.

In carrying out the object of the invention a hub structure of any kind may be provided with spokes of any structure to which an inner rim is secured. This inner rim may be formed of any shape on the inner face, but the outer face is formed with a channel for receiving a number of springs. These springs are secured to an outer rim which is formed with a channel on the inner face. The outer face of the outer rim may be flat or of any other shape, as for instance the shape of a car wheel for fitting on a rail. The various springs are caused to cross each other, and at the crossing of certain of the springs links are provided which also encircle the inner rim and thereby limit the outward movement of the springs.

Referring to the accompanying drawings—Figure 1 is a side view of a wheel embodying the invention, certain parts being broken away, the broken away portions being taken on line 1—1 of Fig. 2; Fig. 2 is a section through Fig. 1 on line 2—2;
Fig. 3 is a section similar to Fig. 2, except that the same discloses a slightly modified form of the hub structure and outer rim structures.

Referring to the accompanying drawings by numeral 1 indicates a hub of any desired kind and 2 any suitable spokes which are connected in any desired manner to an inner rim 3. The inner rim 3 is formed substantially U-shaped in cross section so as to produce a channel 4 and side flanges 5 and 6. Spaced from rim 3 is an outer rim 7 formed substantially U-shaped in cross section so as to provide a channel 8 and side flanges 9 and 10. Rigidly connected to the outer rim 7 are flat springs 11 and 12, the springs 11 and 12 being of the leaf variety, the superimposed leaves being appreciably shorter than the bottom leaves which are formed with a turned-up end 13. Also rigidly secured to the outer rim 7 are springs 14 and 15 constructed similarly to the springs 11 and 12 but arranged in a different vertical plane as shown in Fig. 2. From Fig. 1 it will be noted that the leaves 14 cross leaves 12, and in the crotch between leaves 12 and 14 and also between leaves 11 and 15 links 16 are arranged. The links 16 may be of any desired shape and are preferably formed integral.

The outer rim 7 may be flat as shown in Fig. 2 or cut for receiving a solid rubber tire, if desired, or other cushioning means, or may be constructed as the slightly modified form of the invention shown in Fig. 3 is constructed. Referring to Fig. 3 it will be observed that the outer rim 7' is formed with a flange 17, whereby the wheel shown in Fig. 3 may be used as a car wheel. When a car wheel structure is provided, as shown in Fig. 3, the rim 7' is made heavier, preferably, than rim 7 and also the spokes 2' as well as hub 1' are made heavier so as to stand the extra strain.

The springs 11 and 15 of course may be made of any desired strength according to the weight designed to be placed thereon.

Having thus described my invention what I claim as new and desire to secure by Letters Patent is—

1. In a resilient wheel of the class described, an outer rim, a plurality of springs connected with said outer rim at one end, the opposite ends of said springs being free, each of said springs extending at a tangent, a second set of springs connected with said outer rim in a different plane to said first mentioned springs and crossing said first mentioned springs at substantially right angles thereto, an inner rim adapted to bear against the inner end of said springs, means associated with the springs arranged at the point of crossing of the respective sets of springs for limiting the outward radial movement of the springs, spokes connected to said inner rim, and a hub connected with said spokes.

2. In a resilient wheel of the class described, an outer rim, a plurality of sets of flat springs connected at one end to said outer rim, the springs of one set crossing the springs of the other set at substantially right angles, each set of said springs being in a different plane, an inner rim adapted to bear against the inner end of all of said springs, means loosely fitting in the crotch between said springs and loosely engaging said inner rim for limiting the radial outward movement of said outer rim, a plurality of spokes connected with said inner rim, and a hub connected with said spokes.

3. In a resilient wheel of the class described, an outer rim, a plurality or springs rigidly connected to said outer rim at one end, the opposite ends of the springs being free, each of said springs extending at a tangent, a second set of springs connected with said outer rim in a different plane to said first mentioned springs and crossing said first mentioned springs at substantially right angles thereto, an inner rim adapted to bear against the inner end of all of said springs, a link having a part thereof arranged in the crotch between said springs loosely engaging said inner rim for limiting the radial movement of said outer rim, spokes connected with said inner rim and a hub connected with said spokes.

In testimony whereof I have signed my name to this specification in the presence of two subscribing witnesses.

PETER FRANK MARCANTE.

Witnesses:
JOHN MARSHALL,
VICTOR MARCHETTO.